US010083351B2

(12) United States Patent
Sako et al.

(10) Patent No.: US 10,083,351 B2
(45) Date of Patent: Sep. 25, 2018

(54) CONTROL SYSTEM AND CONTROL METHOD

(71) Applicant: SONY CORPORATION, Tokyo (JP)

(72) Inventors: Yoichiro Sako, Tokyo (JP); Yasunori Kamada, Kanagawa (JP); Takayasu Kon, Tokyo (JP); Kazunori Hayashi, Tokyo (JP); Kohei Asada, Kanagawa (JP); Kazuyuki Sakoda, Chiba (JP); Takatoshi Nakamura, Kanagawa (JP); Mitsuru Takehara, Tokyo (JP); Akira Tange, Tokyo (JP); Hiroyuki Hanaya, Kanagawa (JP); Tomoya Onuma, Kanagawa (JP); Kazuhiro Watanabe, Tokyo (JP); Yuki Koga, Tokyo (JP); Maiko Saitou, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/399,793

(22) Filed: Jan. 6, 2017

(65) Prior Publication Data
US 2017/0116472 A1 Apr. 27, 2017

Related U.S. Application Data

(63) Continuation of application No. 14/416,730, filed as application No. PCT/JP2013/004748 on Aug. 6, 2013, now Pat. No. 9,569,660.

(30) Foreign Application Priority Data

Aug. 23, 2012 (JP) ................ 2012-1874046

(51) Int. Cl.
G06K 9/00 (2006.01)
G06K 9/46 (2006.01)
(Continued)

(52) U.S. Cl.
CPC ..... *G06K 9/00362* (2013.01); *G06K 9/00624* (2013.01); *G06K 9/46* (2013.01); *G06K 9/78* (2013.01); *H04N 5/23206* (2013.01)

(58) Field of Classification Search
CPC .. G06K 9/00362; G06K 9/46; G06K 9/00624; G06K 9/78; H04N 5/23206
(Continued)

(56) References Cited

U.S. PATENT DOCUMENTS

2004/0156535 A1* 8/2004 Goldberg ............. G03D 15/001
382/115
2007/0003113 A1 1/2007 Goldberg
(Continued)

FOREIGN PATENT DOCUMENTS

JP 2001-177750 A 6/2001
JP 2002-041703 A 2/2002
(Continued)

OTHER PUBLICATIONS

Google Glasses; Super-realistic film is coming, Song Ai, China Business Update No. 7, 2012, pp. 94-95.*
(Continued)

Primary Examiner — Gregory F Cunningham
(74) Attorney, Agent, or Firm — Chip Law Group

(57) ABSTRACT

A control system, method and computer program product use control circuitry to respond to an optical detection of a wearable object worn by a user by initiating a service provided to the user, the service being associated with the wearable object.

30 Claims, 11 Drawing Sheets

(51) Int. Cl.
*H04N 5/232* (2006.01)
*G06K 9/78* (2006.01)

(58) Field of Classification Search
USPC .......................................................... 382/103
See application file for complete search history.

(56) References Cited

U.S. PATENT DOCUMENTS

| | | | |
|---|---|---|---|
| 2008/0140228 A1 | 6/2008 | Kang et al. | |
| 2009/0298603 A1* | 12/2009 | Crawford | A63G 4/00 472/137 |
| 2011/0190595 A1* | 8/2011 | Bennett | A61B 1/00016 600/301 |
| 2015/0126226 A1 | 5/2015 | Milikovsky et al. | |

FOREIGN PATENT DOCUMENTS

| | | | | |
|---|---|---|---|---|
| JP | 2003-078804 A | | 3/2003 | |
| JP | 2003-132381 A | | 5/2003 | |
| JP | 20030132381 A1 | * | 5/2003 | ............. G06F 15/02 |
| JP | 2005-124143 A | | 5/2005 | |
| JP | 2005-159558 A | | 6/2005 | |
| JP | 2011-124776 A | | 6/2011 | |
| JP | 2011124776 A | * | 6/2011 | ............. H04N 5/225 |

OTHER PUBLICATIONS

Summons to Attend Oral Proceedings for EP Patent Application No. 13753912.8 dated Apr. 30, 2018, 10 pages of Office Action.*
Ahmed Nabil Belbachir, "Smart Cameras", Spinger, New York, USA, XP055380369A, Dec. 2, 2009, 123 )ages.*
Wikipedia: "Smart camera", XP055380443A, May 9, 2012, 03 pages.*
Wikipedia: Exif\ XP055380447A, Jul. 14, 2012, 10 pages.*
Wikipedia: "Object Hyperlinking", XP055380444A, Jun. 16, 2012, 05 pages.*
Wikipedia: "Vuzix", XP055380450A, Jun. 16, 2012, 04 pages.*
Wikipedia: "Google Glass", XP055380451A, Aug. 16, 2012, 04 pages.*
Wikipedia: "CinemaDNG", XP055467925A, Jun. 22, 2012, 05 pages.*
"Smart Cameras", 2009, 123 pages.
"Object Hyperlinking", Wikipedia, 05 pages.
"Exif", Wikipedia, 10 pages.
"Vuzix", Wikipedia, 04 pages.
"Google Glass", Wikipedia, 04 pages.
"Smart Camera", Wikipedia, 03 pages.
Office Action for EP Patent Application No. 13753912.8, dated Jun. 21, 2017, 08 pages.
International Search Report and Written opinion of PCT Application No. PCT/JP2013/004748, dated Mar. 25, 2014, 11 pages.
Office Action for CN Patent Application No. 201380039373.3, dated May 4, 2017, 15 pages of Office Action and 18 pages of English Translation.
"Google Glasses: Super-realistic film is coming" 2 Pages
Ahmed Nabil Belbachir, "Smart Cameras", Spinger, New York, USA, XP055380369A, Dec. 2, 2009, 123 pages.
Wikipedia: "Exif", XP055380447A, Jul. 14, 2012, 10 pages.

* cited by examiner

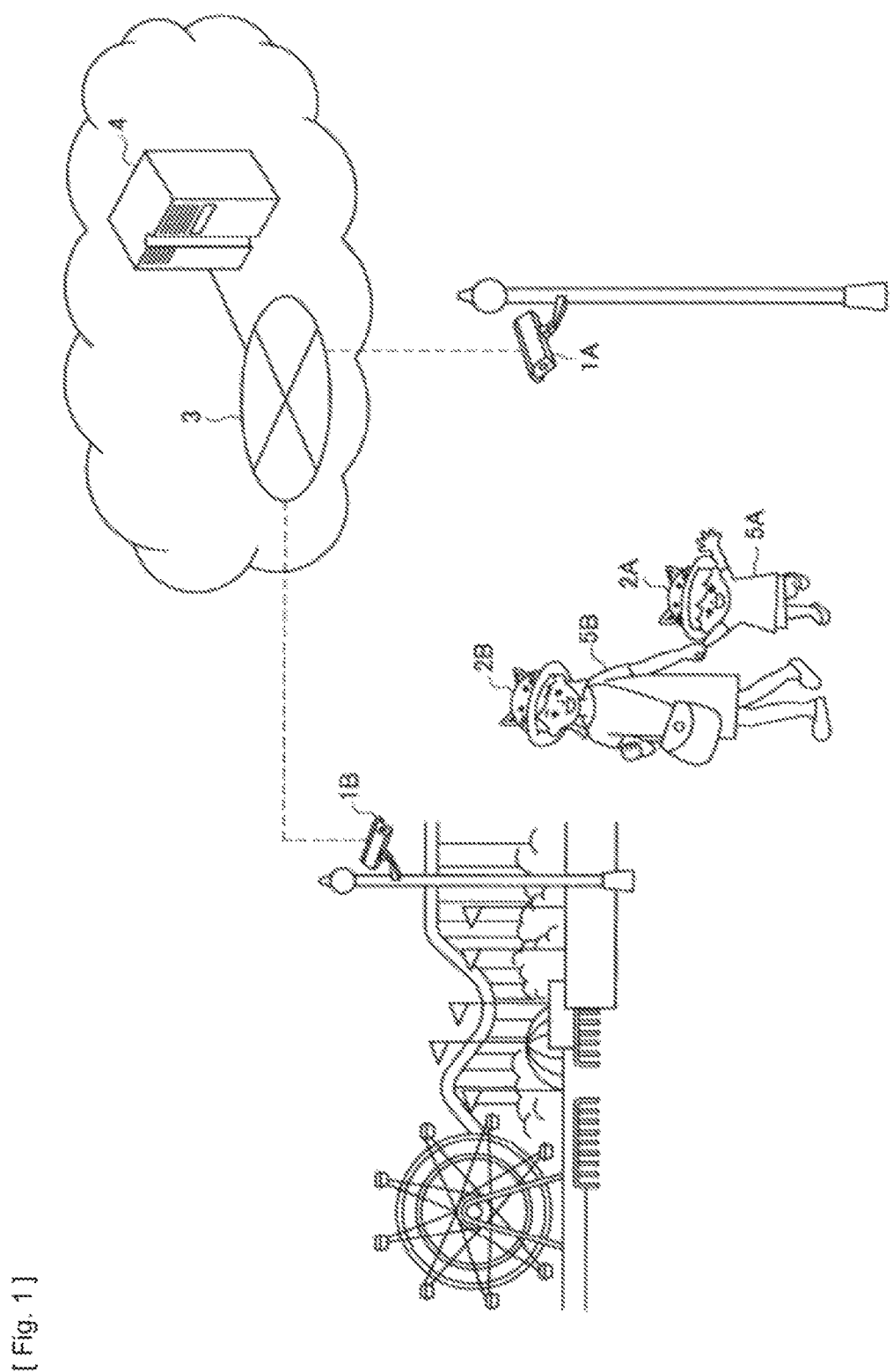

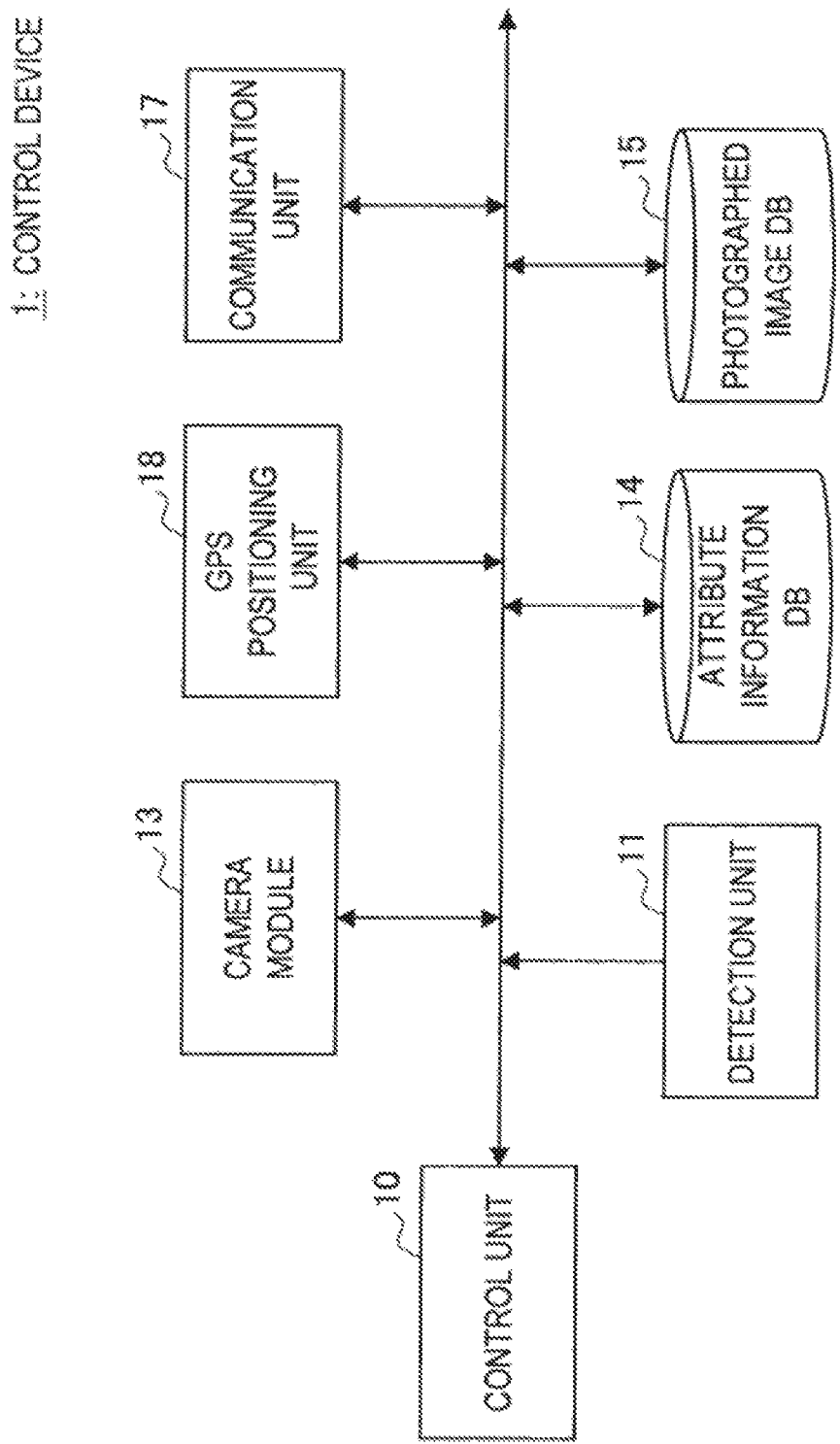
[Fig. 2]

[Fig. 3]

| ATTRIBUTE (ID) | SERVICE CONTENTS |
|---|---|
| VARIOUS KINDS OF CHARACTER HATS | PHOTOGRAPHING SERVICE |
| PREDETERMINED BLINKING PATTERN | NOTIFICATION SERVICE OF VARIOUS KINDS OF INFORMATION |
| PREDETERMINED ACCESSORY | GUIDE SERVICE/ GROUP PHOTOGRAPHING SERVICE/ PHOTOGRAPHING REJECTION SETTING SERVICE/ NOTIFICATION SERVICE OF VARIOUS KINDS OF INFORMATION |
| PREDETERMINED ID NUMBER | PHOTOGRAPHING SERVICE/ GROUP PHOTOGRAPHING SERVICE |

140

[Fig. 4]
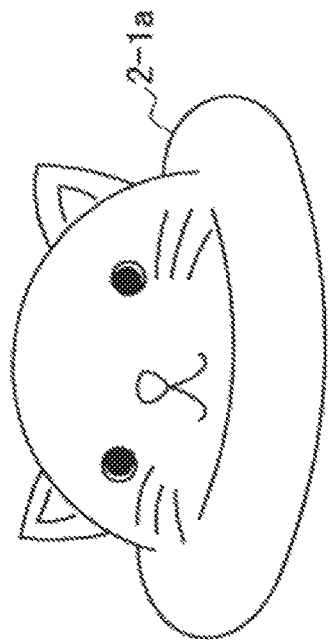
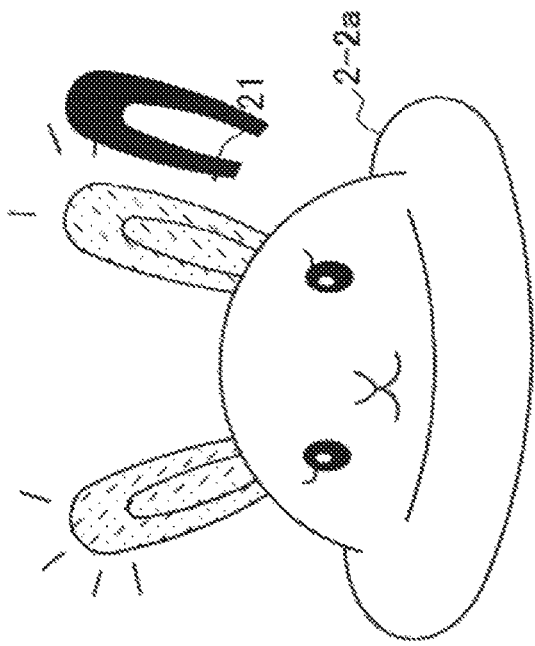
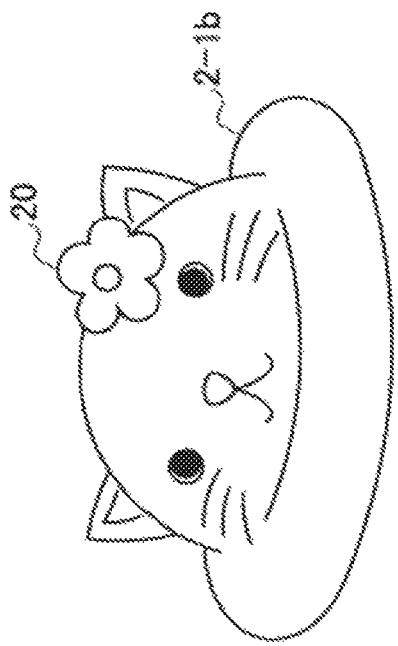
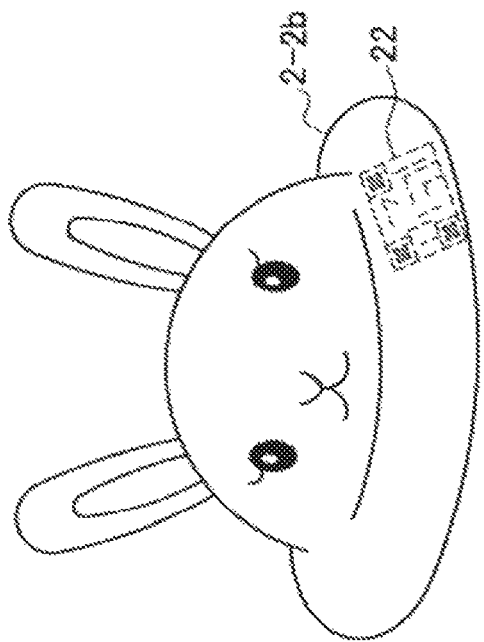

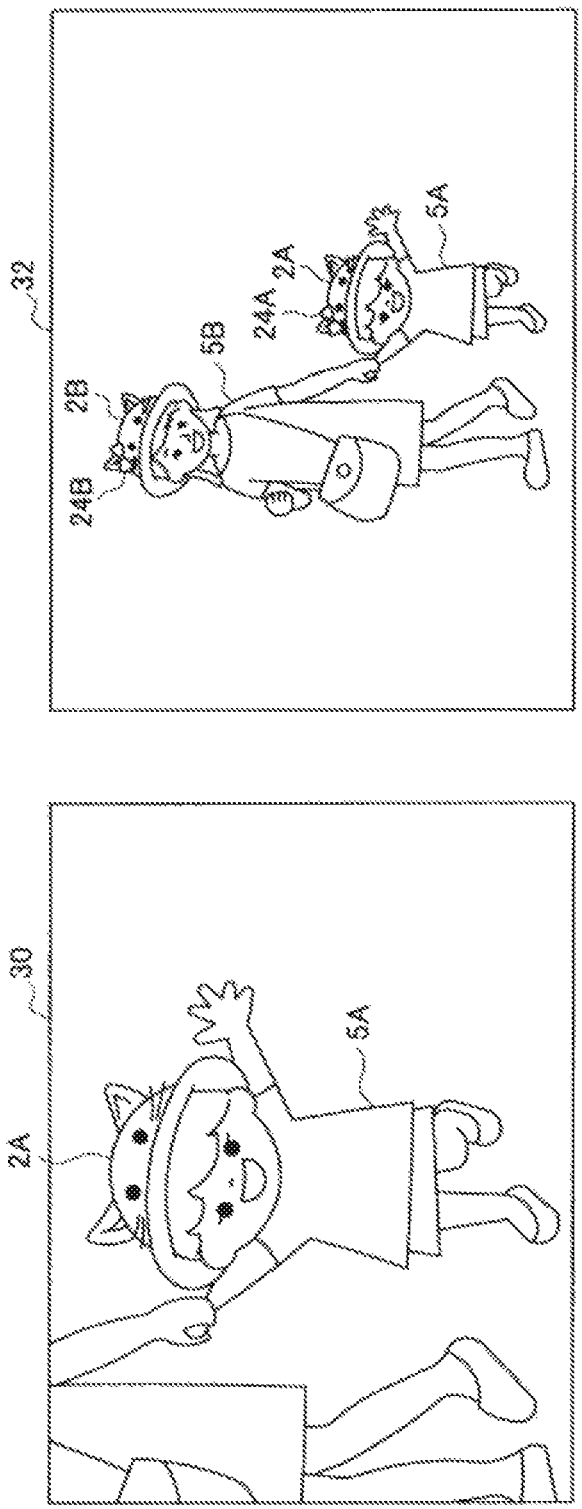

[Fig. 5B]
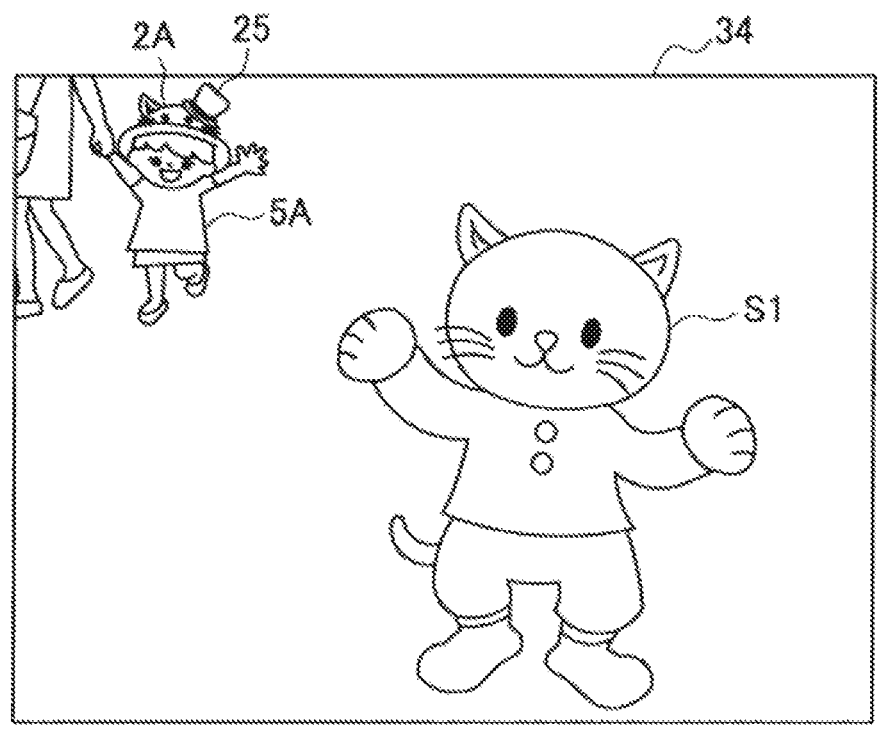

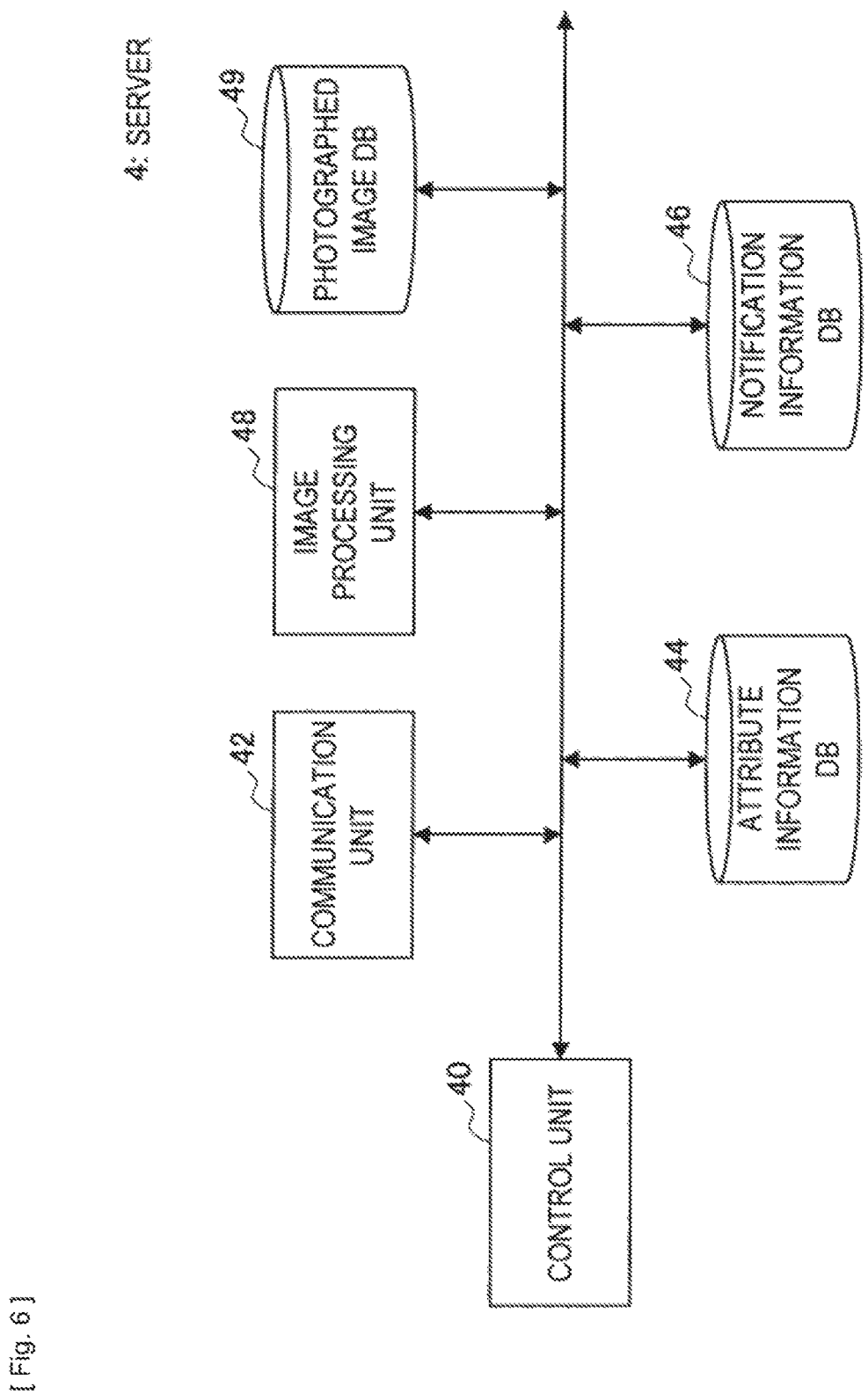
[Fig. 6]

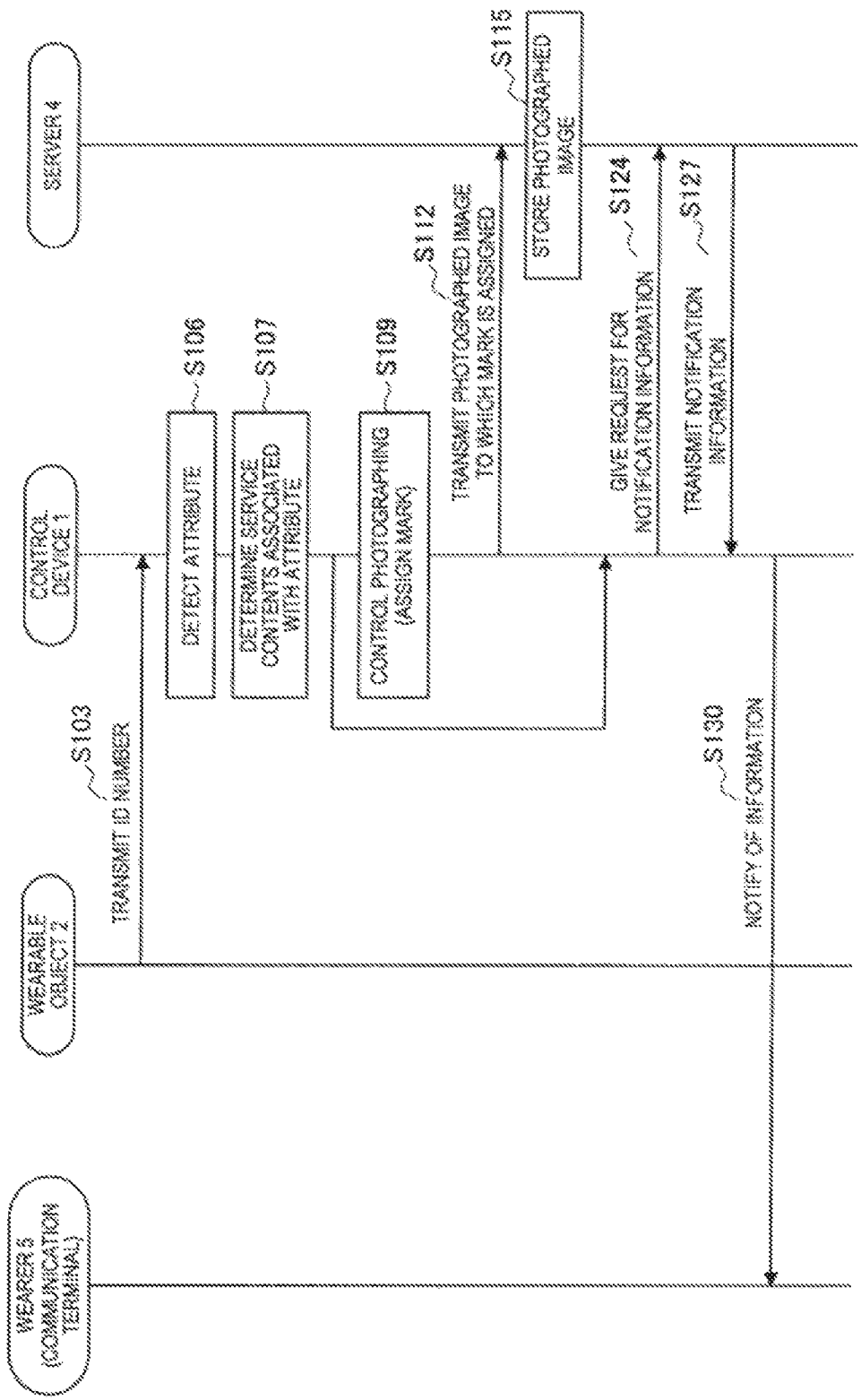
[Fig. 7]

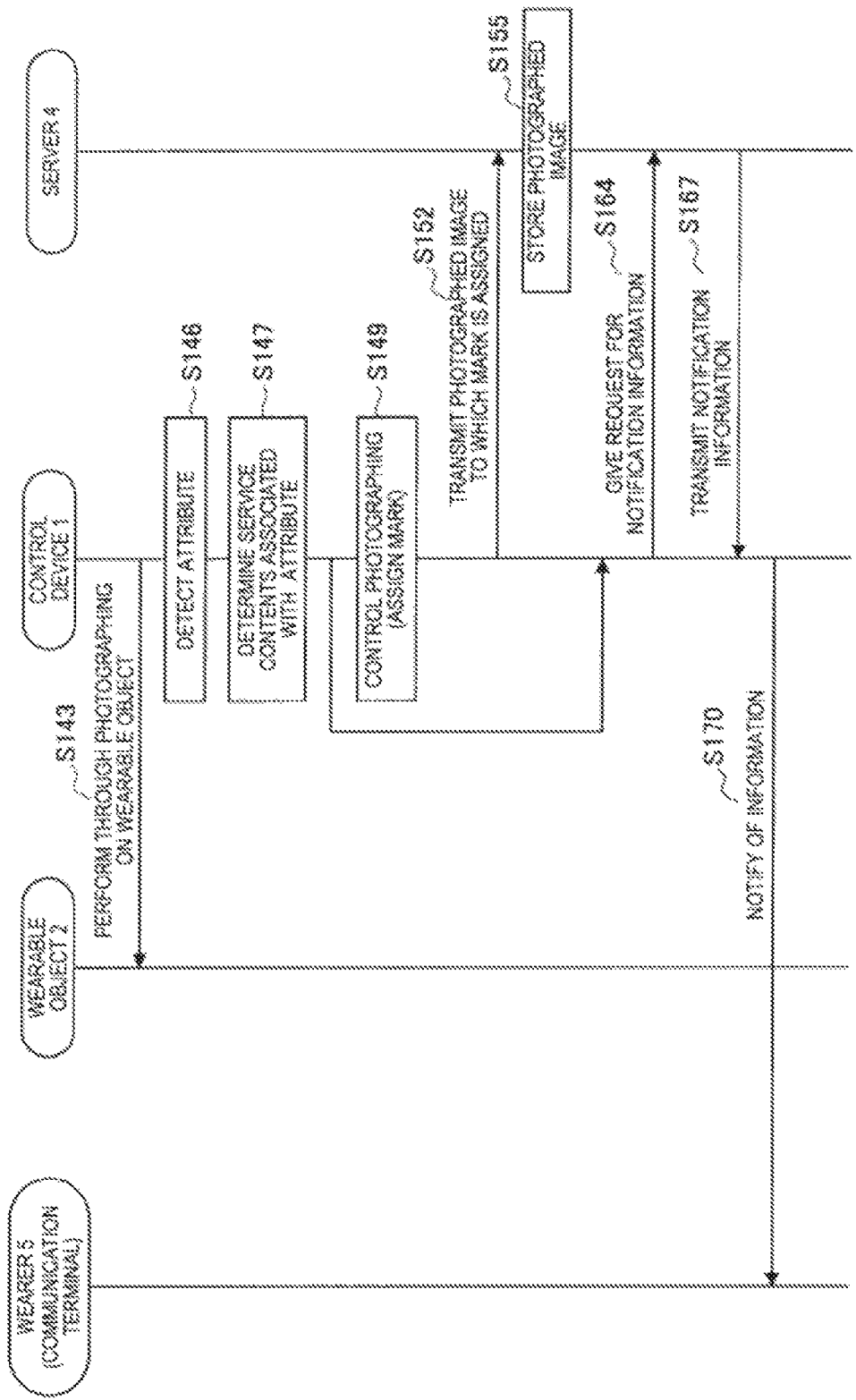
[Fig. 8]

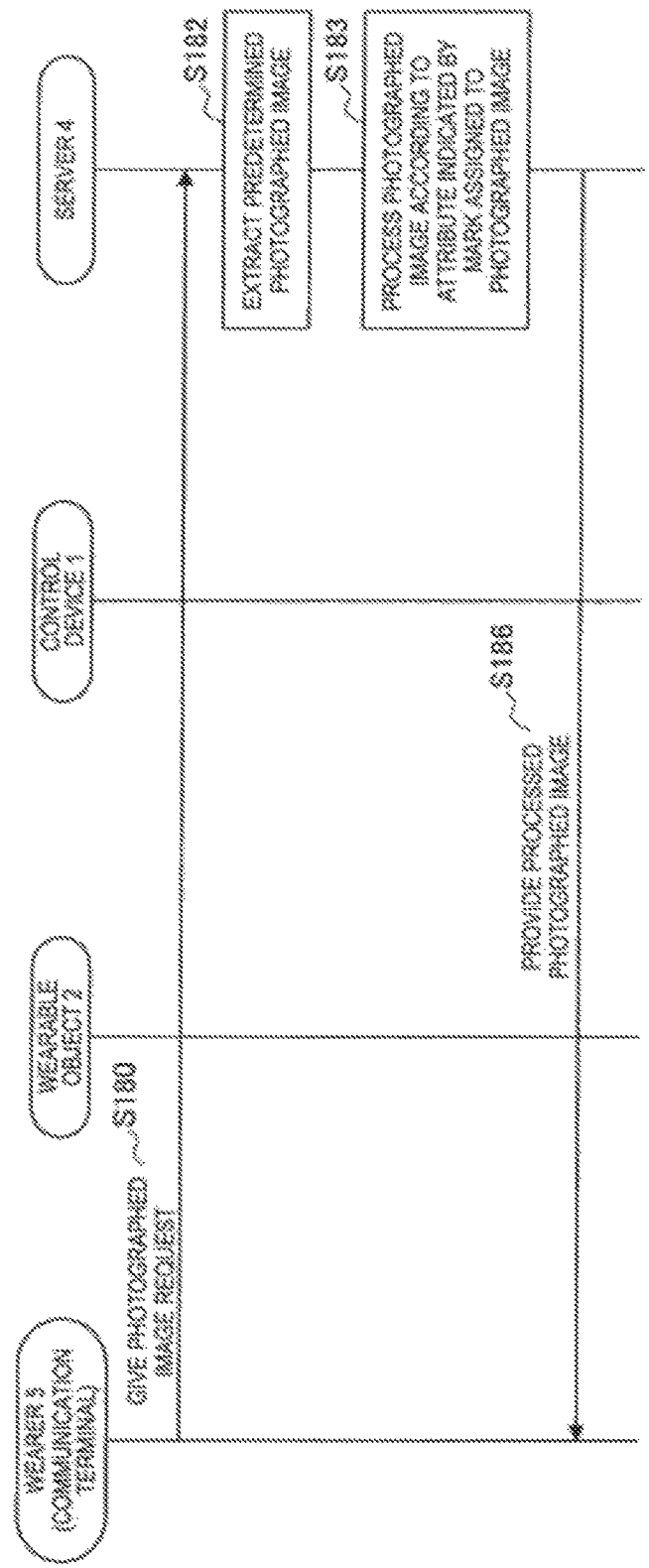

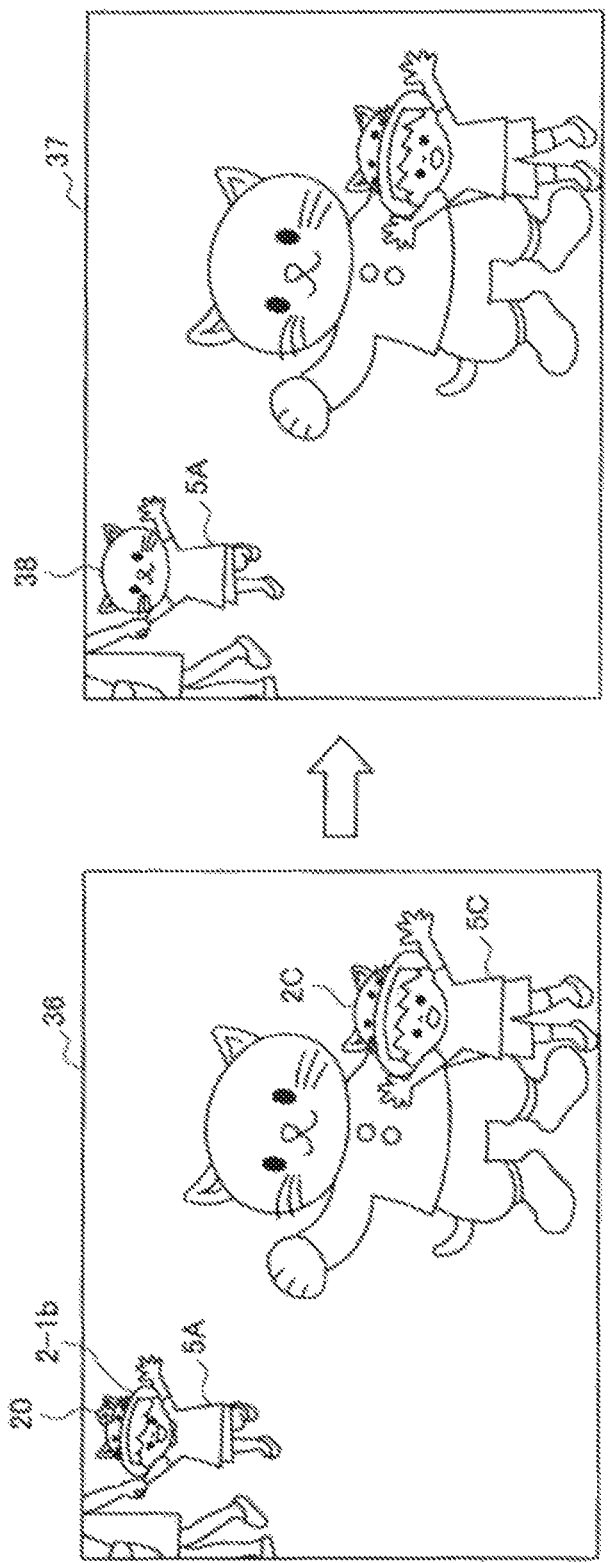
[Fig. 10]

CONTROL SYSTEM AND CONTROL METHOD

CROSS REFERENCE TO RELATED APPLICATIONS

The present application is a continuation application of U.S. patent application Ser. No. 14/416,730, filed Jan. 23, 2015, which is a National Stage Entry of a PCT application PCT/JP13/04748 filed Aug. 6, 2013, which claims the priority from prior Japanese Priority Patent Application 2012-1874046 filed in the Japan Patent Office on Aug. 23, 2012. Each of the above-referenced applications is hereby incorporated herein by reference in its entirety.

TECHNICAL FIELD

The present disclosure relates to a control system and a program.

BACKGROUND ART

In general, in resort facilities or tourist places, various services such as photographing have been provided. For example, in large amusement parks, so-called theme parks, cameras are installed in the spots of attractions. Automatic photographing is performed when vehicles arrive at the spots of attractions, and then photos are printed and sold to people interested in the photos after the attractions end.

In regard to a photographing service, PTL 1 below discloses an image photographing system that distributes a communication mechanism such as a wireless tag only to a visitor to be photographed and performs photographing using a camera installed in a park based on detection of identification information transmitted from the communication mechanism.

PTL 2 below discloses a shutter device that is distributed to a visitor. When a user arrives at a photographing spot in a park, the shutter device notifies the user that the user has arrived at the photographing spot by generating an alarm from a speaker. Further, the shutter device can instruct the camera installed in the photographing spot to perform photographing in response to a button pressing operation performed by the user.

CITATION LIST

Patent Literature

[PTL 1] JP 2001-177750A
[PTL 2] JP 2003-78804A

SUMMARY

Technical Problem

However, PTL 1 and PTL 2 described above do not particularly mention that an entertainment feature is provided to the wireless tag or the shutter device carried by a visitor. The wireless tag or the shutter device is used only for photographing.

On the other hand, in theme parks, characters or the like unique to the theme parks are present. Therefore, visitors can often photograph the characters that the visitors prefer or photographing is performed together with the characters that the visitors prefer. In the theme parks, many wearable objects imitating the characters are usually sold. Therefore, the visitors can wear and enjoy the wearable objects imitating the characters that the visitors like. However, these wearable objects are used only when the visitors wear and enjoy the wearable objects, and thus are not associated with supply of various services such as the above-described photographing.

It is desirable to provide a novel and improved control system and a novel and improved program capable of providing a service according to a wearable object.

Solution to Problem

According to an embodiment of the present disclosure, there is provided a control system that includes control circuitry that responds to an optical detection of a wearable object worn by a user by initiating a service provided to the user, the service being associated with the wearable object.

According to an embodiment of the present disclosure, there is provided a method that includes:
receiving an indication of a wearable object worn by a user;
associating with control circuitry the wearable object with a service; and
initiating with the control circuitry the service associated with the wearable object.

Advantageous Effects of Invention

According to embodiments of the present disclosure described above, it is possible to provide a service according to a wearable object.

BRIEF DESCRIPTION OF DRAWINGS

FIG. 1 is an explanatory diagram illustrating an overview of a control system according to an embodiment of the present disclosure.

FIG. 2 is a block diagram illustrating the configuration of a control device according to the embodiment.

FIG. 3 is a diagram illustrating an example of attribute information according to the embodiment.

FIG. 4 is a diagram illustrating a specific example of a wearable object according to the embodiment.

FIG. 5A is a diagram illustrating an example of a photographed image photographed according to an attribute of a wearable object according to the embodiment.

FIG. 5B is a diagram illustrating an example of a photographed image photographed according to an attribute of a wearable object according to the embodiment.

FIG. 6 is a block diagram illustrating the configuration of a server according to the embodiment.

FIG. 7 is a flowchart illustrating a process of the control system according to the embodiment.

FIG. 8 is a flowchart illustrating another process of the control system according to the embodiment.

FIG. 9 is a flowchart illustrating a process of providing a photographed image according to the embodiment.

FIG. 10 is an explanatory diagram illustrating an example of image processing in a photographing rejection setting service according to the embodiment.

DESCRIPTION OF EMBODIMENTS

Hereinafter, preferred embodiments of the present disclosure will be described in detail with reference to the appended drawings. Through the specification and the drawings, the same reference numerals are given to constituent elements having substantially the same functional configurations and the repeated description thereof will be omitted.

The description will be made in the following order.

1. Overview of control system according to embodiment of the present disclosure
2. Basic configuration
2-1. Configuration of control device
2-2. Configuration of server
3. Process
4. Supplement
5. Summarization <1. Overview of Control System According to Embodiment of the Present Disclosure>

First, an overview of a control system according to an embodiment of the present disclosure will be described with reference to FIG. 1. FIG. 1 is an explanatory diagram illustrating the overview of the control system according to an embodiment of the present disclosure. In the control system according to this embodiment, a case in which visitors wear predetermined wearable objects in a large amusement park or a so-called theme park will be assumed. Here, the predetermined wearable objects may be objects imitating characters unique to the theme park. Specific examples of wearable objects according to this embodiment include not only hats illustrated in FIG. 1 but also glasses, clothes, brooches, pendants, watches, and umbrellas.

In this way, the visitors can wear and enjoy wearable objects imitating characters that the visitors like. However, normally, these wearable objects are used only when the visitors wear and enjoy the wearable objects, and thus are not associated with supply of various services such as the above-described photographing provided in the theme park.

Accordingly, in consideration of the above-mentioned circumstance as a viewpoint, the control system according to each embodiment has been created. The control system according to each embodiment of the present disclosure can provide a service according to a wearable object. Thus, the control system can provide an entertainment feature in which the visitors can not only wear but also enjoy wearable objects and a convenience feature in which various services can be provided when the visitors carry the wearable object.

Specifically, as illustrated in FIG. 1, control devices 1A and 1B disposed around wearers (visitors) 5A and 5B wearing wearable objects 2A and 2B provide various services according to the wearable objects. The control devices 1A and 1B are disposed around places such as the walls of buildings, ceilings, and street lamps and attractions (vehicles) or the like in the theme park and have a function of photographing users from the surroundings. FIG. 1 illustrates an example in which the plurality of control devices are disposed. However, only one control device may be disposed. The control devices 1A and 1B are connected to a network 3 in a wired or wireless way. A server 4 is connected to the network 3.

The control devices 1A and 1B illustrated in FIG. 1 detect attributes of the wearable objects 2A and 2B by photographing the wearers 5A and 5B and analyzing the photographed images and provide predetermined services according to the detected attributes. For example, the control devices 1A and 1B photograph the wearers 5A and 5B wearing the wearable objects 2A and 2B or acquire predetermined information from the server 4 and notify the wearers 5A and 5B of the information.

The overview of the control system according to the embodiment of the present disclosure has been described. Next, the configurations of the control device 1 and the server 4 included in the control system according to this embodiment will be described in detail with reference to FIGS. 2 to 5B.

<2. Basic Configuration>

{2-1. Configuration of Control Device}

FIG. 2 is a block diagram illustrating the configuration of the control device 1 according to this embodiment. As illustrated in FIG. 2, the control device 1 according to this embodiment includes a control unit 10, a detection unit 11, a camera module 13, an attribute information DB (database) 14, a photographed image DB 15, a communication unit 17, and a GPS positioning unit 18. Hereinafter, each configuration will be described in detail.

(Camera Module)

The camera module 13 includes a photographing image signal processing unit and an imaging optical system that includes an imaging element and an imaging lens. The camera module 13 outputs data of a photographed image set as a digital signal. The imaging element is realized, for example, by a CCD (Charge Coupled device) imager or a CMOS (Complementary Metal Oxide Semiconductor) imager.

(Attribute Information DB)

The attribute information DB 14 is a storage unit that stores information (attribute information) regarding service contents corresponding to an attribute (ID) of a wearable object. Here, examples of the attribute information according to this embodiment are illustrated in FIG. 3. As illustrated in FIG. 3, the attribute (ID) of a wearable object may be, for example, kinds of wearable objects (various kinds of character hats or the like), a blinking pattern of a wearable object, a predetermined accessory, or a predetermined ID number. As illustrated in FIG. 3, a photographing service, a notification service of various kinds of information, a guide service, a group photographing service, a photographing rejection setting service, and the like can be associated according to respective attributes.

(Photographed Image DB)

The photographed image DB 15 is a storage unit that stores a photographed image photographed by the camera module 13. Further, the photographed image DB 15 may store a photographed image in association with place information positioned by the GPS positioning unit 18 and photographing time information.

(Communication Unit)

The communication unit 17 is a communication interface that performs data communication with an external device. For example, the communication unit 17 according to this embodiment is connected to the server 4 via the network 3 to transmit and receive data. Specifically, the communication unit 17 transmits a photographed image photographed by the camera module 13 to the server 4 or receives various kinds of notification information from the server 4. The communication unit 17 also functions as a notification unit that notifies the wearer 5 (a communication terminal carried by the wearer 5) of various kinds of information under the control of the control unit 10. At this time, the communication unit 17 may notify (through transmission) the wearer 5 (the communication terminal carried by the wearer 5) of various kinds of information through a wireless LAN, Wi-Fi, infrared communication, Bluetooth (registered trademark), or the like.

(GPS Positioning Unit)

The GPS (Global Positioning System) positioning unit 18 receives a radio wave from a GPS satellite and measures the position at which the control device 1 is located. The GPS positioning unit 18 is an example of a place information acquisition unit that acquires current place information of the control device 1 based on a signal acquired from the outside. An example of the place information acquisition unit according to this embodiment is not limited thereto. For example, the place information acquisition unit may be a unit that detects current place information through Wi-Fi, transmission and reception to and from a portable telephone, a PHS, a smartphone, or the like, short-range communication, or the like.

(Detection Unit)

The detection unit 11 has a function of detecting an attribute of a wearable object. Specifically, for example, the detection unit 11 according to this embodiment detects an attribute of a wearable object shown within an angle of view by analyzing a photographed image photographed by the camera module 13.

For example, the detection unit 11 detects attributes (kinds) of hats of various characters by performing pattern matching with a photographed image based on an image pattern used to recognize the hats of the various characters. Here, specific examples of wearable objects 2 are illustrated in FIG. 4. The detection unit 11 detects "cat hat" as an attribute, when the detection unit 11 recognizes a wearable object 2-1a of a character hat imitating a cat in a photographed image, as illustrated in FIG. 4. Optionally, a user may pre-register an image that is stored by the system. Then when the system takes photographs of people in a public area, the system can compare the captured image with the stored image to determine if there is a match. When a match exists, the system may provide information or services that are customized for that user. For example, a user might be watching a baseball game, and when the system detects the presence of that user, the system can offer a service to that user, such as statistics for ballplayer for that user, or perhaps a closed caption discussion of commentators for that person's baseball team. Optionally the information may be sent directly to the user, who may view the information on the wearable device, such as a glasses-type display or head-mounted display.

The detection unit 11 may detect a predetermined wearable object as an attribute by performing pattern matching with a photographed image based on an image pattern used for a predetermined wearable object. The predetermined wearable object may be not only glasses or a necklace but also an item attached to a hat imitating a character. For example, the detection unit 11 may detect "cat hat and item 20" as an attribute when the detection unit 11 recognizes a wearable object 2-1b of a character hat to which the item 20 is attached, as illustrated in FIG. 4.

The detection unit 11 may detect a predetermined color or a blinking pattern as an attribute of the wearable object 2. For example, the detection unit 11 may detect "rabbit hat" and a "predetermined blinking pattern" based on blinking of a light-emitting unit 21 as an attribute when the detection unit 11 recognizes a wearable object 2-2a of a character hat imitating a rabbit and including the light-emitting unit 21, as illustrated in FIG. 4.

Here, the light-emitting unit 21 may emit light when it is determined that surroundings are dark. The light-emitting unit 21 may emit infrared light at daytime and emit visible light at nighttime. Even when the light-emitting unit 21 emits light in the same blinking pattern, a blinking pattern detected by the detection unit 11 may be different depending on a movement of the wearer 5 in some cases. Thus, for example, the wearer 5 wearing a wearable object 2-2a including the light-emitting unit 21 that emits light in a given blinking pattern may be provided with different services when the wearer 5 is stopped, walking, and running.

The detection unit 11 may recognize a predetermined ID number and detect the predetermined ID number as an attribute of the wearable object 2. The predetermined ID number may be transmitted from the wearable object 2 or may be read based on a photographed image. For example, the detection unit 11 may detect "rabbit hat and predetermined ID number" as an attribute when the detection unit 11 recognizes a wearable object 2-2b of a character hat to which a two-dimensional tag 22 illustrated in FIG. 4 is attached. The detection unit 11 may detect the ID number by reading a light emission pattern of an LED (Light Emitting Diode) installed in the wearable object 2.

(Control Unit)

The control unit 10 is a control unit that controls each configuration of the control device 1. The control unit 10 according to this embodiment may perform through-photographing control to continuously acquire photographed images (through images) by the camera module 13. The control unit 10 sequentially transmits the continuously acquired through images to the detection unit 11 and performs control such that the detection unit 11 detects an attribute of a wearable object. The control unit 10 performs control such that a service is provided to a wearer wearing a wearable object according to an attribute of the wearable object detected by the detection unit 11.

Specifically, when the detection unit 11 detects "hats of various characters" as attributes of the wearable objects, the control unit 10 determines service contents corresponding to "hats of various characters" with reference to attribute information 140 stored in the attribute information DB 14. As illustrated in FIG. 3, "photographing service" can be associated with "hats of various characters." Therefore, the control unit 10 controls the camera module 13 such that the camera module 13 focuses on the wearer 5 wearing the wearable object 2 and performs photographing. Here, FIG. 5A illustrates examples of photographed images photographed according to the attribute of the wearable object 2 according to this embodiment. A photographed image 30 illustrated in FIG. 5A is an image when the control unit 10 causes the camera module 13 to focus on a wearer 5A wearing a wearable object 2A according to an attribute (hats of various characters) of the wearable object 2A and perform photographing.

The photographed image can be associated with a photographing date, a photographing place (place information positioned by the GPS positioning unit 18), an ID of the control device 1 (hereinafter referred to as a control device ID), and a mark indicating an attribute of a wearable object detected by the detection unit 11 (a tag is assigned), and is stored in the photographed image DB 15 or is transmitted to the server 4.

When through images photographed continuously by the camera module 13 are stored sequentially in the photographed image DB 15 (continuous photographing or video recording is performed), the control unit 10 may assign a mark indicating an attribute of a wearable object to a photographed image (a frame or a part of a video) photographed and controlled according to the attribute of the wearable object detected by the detection unit 11. The control unit 10 may transmit, to the server 4, the photographed image (frame) to which the mark indicating the attribute of the wearable object is assigned in association with a photographing date, a photographing place (place information positioned by the GPS positioning unit 18), and a control device ID (in association with a tag).

When the detection unit 11 detects "predetermined blinking pattern" as the attribute of the wearable object, the control unit 10 determines service contents corresponding to "predetermined blinking pattern" with reference to the attribute information 140 stored in the attribute information DB 14. As illustrated in FIG. 3, "notification service of various kinds of information" can be associated with "predetermined blinking pattern." Therefore, the control unit 10 notifies the wearer 5 of predetermined information from the communication unit 17.

Here, when the wearer 5 carries a communication terminal (such as a smartphone, a portable telephone, or a tablet terminal) including a display unit, the control unit 10 may notify the wearer 5 of the predetermined information by transmitting the predetermined information from the communication unit 17 to the communication terminal (not illustrated) carried by the wearer 5. Further, the communication terminal may be a glasses-type display device (or head-mounted display) in which a display panel capable of controlling transmittance is disposed in each of right-eye and left-eye lens positions, as disclosed in Japanese Patent No. 4853320. In such a glasses-type display device (or a head-mounted display), the display panels can enter a transparent or translucent state by controlling the transmittance of the display panels. Therefore, the glasses-type display device is a device (see-through device) with which the wearer 5 can conduct normal life even when the wearer 5 normally wears the glasses-type display device like glasses. The see-through device may be integrated with the wearable object 2.

The notification information of which the control unit 10 notifies the wearer from the communication unit 17 may be, for example, place and time information of a show hosted in a theme park, map information of the theme park, or waiting time information of each attraction (vehicle) of the theme park. The control unit 10 may acquire the latest information of the above information from the server 4.

The control unit 10 may perform control such that the guide service, the group photographing service, or the photographing rejection setting service, or the like is provided according to an attribute of a wearable object, as illustrated in FIG. 3. The provision of the guide service is provision of a service that guides the wearer 5 to a predetermined place according to the attribute of the wearable object. For example, the control unit 10 transmits, to the communication terminal carried by the wearer 5, guide information (such as an image or a sound) used to guide the wearer 5 to the place of a show, the place of an attraction, or a place in which a character imitated by the hat is present. When a speaker and a communication unit are installed in the wearable object 2, the control unit 10 can transmit sound information for guide to the wearable object 2. The control unit 10 may acquire predetermined guide information according to the attribute of the wearable object from the server 4.

The provision of the group photographing service is, for example, provision of a service in which photographing is performed so that the plurality of neighboring wearers 5 wearing the wearable object 2 to which the same accessory (item) is attached are contained in an angle of view. For example, as in a photographed image 32 illustrated in FIG. 5A, the control unit 10 controls the camera module 13 such that the camera module 13 focuses on the wearers 5A and 5B wearing the wearable objects 2A and 2B to which the same items 24A and 24B are attached so as to be contained in angle of view and performs the photographing.

The control unit 10 may provide a character photographing service according to a predetermined item attached to a wearable object of a character hat. For example, when the detection unit 11 detects "cat hat and item 25" as an attribute of the wearable object 2A, the control unit 10 performs control such that the wearer 5A and a cat character S1 which is a character imitated by the wearable object 2A and is located near the wearer 5A are focused on and photographed, as in a photographed image 34 illustrated in FIG. 5B. Thus, when the wearer 5A wears the wearable object 2A of a hat which imitates the character which the wearer 5A likes and to which the predetermined item 25 is attached, the wearer 5A is automatically photographed together with the character which the wearer 5A likes.

The provision of the photographing rejection setting service is provision of a service in which, for example, a face image is processed so that a wearer is not identified when a photographed image is provided. Detailed description will be made below with reference to FIGS. 9 and 10.

The configuration of the control device 1 according to this embodiment has been described in detail. Next, the configuration of the server 4 included in the control system according to this embodiment will be described with reference to FIG. 6.

{2-2. Configuration of Server}

FIG. 6 is a block diagram illustrating the configuration of the server 4 according to this embodiment. As illustrated in FIG. 6, the server 4 includes a control unit 40, a communication unit 42, an attribute information DB 44, a notification information DB 46, an image processing unit 48, and a photographed image DB 49.

(Communication Unit)

The communication unit 42 is a communication interface that performs data communication with an external device. For example, the communication unit 42 according to this embodiment is connected to the control device 1 via the network 3 to transmit and receive data. Specifically, the communication unit 42 receives a photographed image from the control device 1 or transmits various kinds of notification information in response to a request from the control device 1.

(Attribute Information DB)

The attribute information DB 44 is a storage unit that stores information (attribute information) of service contents according to an attribute (ID) of a wearable object. Since the attribute information has been described above with reference to FIG. 3, the description thereof will be omitted.

(Notification Information DB)

The notification information DB 46 is a storage unit that stores various kinds of notification information. The various kinds of notification information may be, for example, place and time information of a show hosted in a theme park, map information of the theme park, or waiting time information of each attraction (vehicle) of the theme park, as described above.

(Photographed Image DB)

The photographed image DB 49 is a storage unit that stores a photographed image transmitted from the control device 1. Specifically, the photographed image DB 49 according to this embodiment may store the photographed image in association with a photographing date, a photographing place (place information positioned by the GPS positioning unit 18), a control device ID, and a mark indicating an attribute of a wearable object.

(Image Processing Unit)

The image processing unit 48 has a function of processing the photographed image stored in the photographed image DB 49. More specifically, the image processing unit 48 processes the photographed image according to an attribute of a wearable object indicated by a mark associated with the photographed image. For example, when service contents associated with an attribute of a wearable object are "photographing rejection setting service," the image processing unit 48 processes a photographed image so that a wearer wearing the wearable object is not identified.

The image processing unit 48 may generate an image indicating a behavior history (route) of a wearer based on a photographing date, a photographing place, and a control device ID associated with the photographed image. For example, the image processing unit 48 generates a route map image in which a walking route of the wearer 5, a photographing point (photographing place) on the route, and a photographed image photographed by the control device 1 and disposed at the photographing point overlap on the map image of the theme park.

The image processing unit 48 may extract a predetermined photographed image to be processed from the photographed image DB 49 by matching place and time information (behavior history) acquired by a GPS logger installed in the wearable object 2 worn by the wearer 5 with a photographing time and a photographing place of the photographed image. The image processing unit 48 may generate images for which a plurality of predetermined photographed images (photographed images in which the wearer 5 is assumed to be shown) extracted from the photographed image DB 49 are displayed in a thumbnail format.

(Control Unit)

The control unit 40 controls each configuration of the server 4. More specifically, the control unit 40 according to this embodiment performs control such that a photographed image received from the control device 1 by the communication unit 42 is stored in the photographed image DB 49.

The control unit 40 extracts information stored in the attribute information DB 44 or information stored in the notification information DB 46 in response to a request from the control device 1 and transmits the information to the control device 1.

The control unit 40 performs control such that a predetermined photographed image is extracted from the photographed image DB 49 in response to a photographed image request from a wearer and is provided to the wearer. The control unit 40 may cause the image processing unit 48 to process a photographed image extracted from the photographed image DB 49 in response to an instruction from a wearer or according to an attribute of a wearable object indicated by a mark associated with the photographed image, and then provide the photographed image to the wearer.

The configurations of the control device 1 and the server 4 included in the control system according to this embodiment have been described in detail. Thus, the wearer 5 can wear and enjoy the wearable object 2 and can also be provided with various services according to the attribute of the wearable object 2 from the control system according to this embodiment.

<3. Process>

Next, a process of the control system according to this embodiment will be described. FIG. 7 is a flowchart illustrating the process of the control system according to this embodiment.

As illustrated in FIG. 7, in step S103, the wearable object 2 first transmits an ID number to the control device 1. Specifically, the ID number indicating the attribute of the wearable object 2 is transmitted from the communication unit (not illustrated) installed in the wearable object 2. The communication unit installed in the wearable object 2 may broadcast the ID number regularly/irregularly.

Next, in step S106, the detection unit 11 of the control device 1 detects the ID number received from the wearable object 2 by the communication unit 17 as the attribute of the wearable object 2.

Next, in step S107, the control unit 10 of the control device 1 determines service contents associated with the attribute of the wearable object 2 detected by the detection unit 11 with reference to the attribute information DB 14.

Next, when the service contents associated with the attribute of the wearable object 2 are the photographing service, in step S109, the control unit 10 of the control device 1 controls the camera module 13 such that the camera module 13 focuses on the wearer 5 wearing the wearable object 2 and performs the photographing. At this time, the control unit 10 may assign, to the photographed image, the mark indicating the attribute of the wearable object 2 detected in step S106 described above.

Subsequently, in step S112, the communication unit 17 of the control device 1 transmits, to the server 4, the photographed image to which the mark is assigned.

In step S115, the server 4 stores the photographed image received from the control device 1 in the photographed image DB 49.

On the other hand, when the service contents associated with the attribute of the wearable object 2 are the notification service of various kinds of information in step S107, in step S124, the control unit 10 of the control device 1 causes the communication unit 17 to give the server 4 a request for information of which the wearer 5 is notified.

Next, in step S127, the server 4 transmits, to the control device 1, the predetermined notification information extracted from the notification information DB 46 in response to the request from the control device 1.

In step S130, the control device 1 notifies the wearer 5 of the predetermined information and performs an information provision service. Specifically, the control device 1 transmits the predetermined information to the communication terminal (not illustrated) carried by the wearer 5. Here, the communication terminal carried by the wearer 5 includes a display unit, as described above, or an actuator such as a speaker and outputs the information received from the control device 1 from the actuator.

The process of the control system according to this embodiment has been described. The detection unit 11 according to this embodiment may detect the ID number transmitted from the wearable object 2 as the attribute of the wearable object 2 and, as described above, may also detect the attribute of the wearable object shown in an angle of view by analyzing a photographed image (through image) subjected to through photographing by the camera module 13. Thus, a process of detecting the attribute of the wearable object 2 by analyzing the through image by the detection unit 11 of the control device 1 will be described with reference to FIG. 8.

FIG. 8 is a flowchart illustrating another process of the control system according to this embodiment. As illustrated in FIG. 8, in step S143, the control unit 10 of the control device 1 first performs control such that the camera module 13 performs through photographing of the wearable object 2.

Next, in step S146, the detection unit 11 of the control device 1 detects the attribute of the wearable object 2 by sequentially analyzing the through images.

Subsequently, since the processes of step S147 to step S170 are the same as those of step S107 to S130 illustrated in FIG. 7, the description thereof will be omitted.

Thus, the detection unit 11 of the control device 1 according to this embodiment may detect the attribute of the wearable object 2 by analyzing the through images.

<4. Supplement>

The control system according to this embodiment has been described in detail. The control system according to an embodiment of the present disclosure is not limited to the control system described above in the embodiment. Hereinafter, supplementary description of the control system according to this embodiment will be made.

{4-1. Amount of Remaining Battery of Wearable Object 2}

As described above, when the wearable object 2 according to this embodiment includes the communication unit, the light-emitting unit 21, the display unit, and the speaker, the wearable object 2 is assumed to be driven by a battery.

In this case, the wearable object 2 may perform control such that the eyes of a character provided in the wearable object 2 are closed according to the amount of remaining battery. Specifically, the wearable object 2 performs the control such that the character closes its eyes as the amount of remaining battery decreases. Thus, the wearer 5 can intuitively understand that the amount of remaining battery is small.

{4-2. Processing of Photographed Image}

A photographed image photographed by the control device 1 according to this embodiment and stored in the photographed image DB 49 of the server 4 is provided in response to a request from the wearer 5. Here, as described above, the control system according to this embodiment may also provide an image processed by the image processing unit 48 of the server 4, as described above. Hereinafter, the detailed description will be made with reference to FIG. 9.

FIG. 9 is a flowchart illustrating a process of providing a photographed image according to this embodiment. As illustrated in FIG. 9, in step S180, the wearer 5 first gives a photographed image request to the server 4. Specifically, the communication terminal (an information processing device, a portable terminal, a smartphone, a tablet terminal, or the like) transmits the photographed image request to the server 4 in response to an operation of the wearer 5. The photographed image request may include a processing instruction or a behavior history of the wearer 5.

Next, in step S182, the control unit 40 of the server 4 extracts a predetermined photographed image from the photographed image DB 49 in response to the photographed image request from the wearer 5. The control unit 40 may extract the predetermined photographed image, for example, by matching the behavior history (place and time) of the wearer 5 included in the photographed image request with the photographed place and the photographed time of the photographed image.

Next, in step S183, the control unit 40 of the server 4 controls the image processing unit 48 such that the image processing unit 48 processes the photographed image according to the attribute of the wearable object 2 indicated by the mark assigned to the extracted photographed image. The control unit 40 may process the photographed image in response to the processing instruction included in the photographed image request.

In step S186, the server 4 provides the processed photographed image to the wearer 5. Specifically, the server 4 transmits the processed photographed image to the communication terminal which is a request source.

The process of providing the photographed image has been described according to this embodiment. Next, a processing example of the image processing unit 48 when the service associated with the attribute of the wearable object 2 indicated by the mark assigned to the photographed image is "photographing rejection setting service" will be described in detail with reference to FIG. 10.

FIG. 10 is an explanatory diagram illustrating an example of image processing in the photographing rejection setting service. A photographed image 36 in FIG. 10 is a photographed image which is photographed by focusing on a wearer 5C wearing a wearable object 2C according to an attribute of the wearable object 2C. Here, in the photographed image 36, as illustrated in FIG. 10, another wearer 5A other than the wearer 5C is assumed to be contained in an angle of view. In this case, a mark indicating an attribute of an item 20 attached to a wearable object 2-1b worn by the wearer 5A is also assigned to the photographed image 36.

When the photographed image 36 is provided in response to a photographed image acquisition request from the wearer 5C and the attribute indicated by the mark assigned to the photographed image 36 is associated with "photographing rejection setting service," the control unit 40 of the server 4 performs control such that the image processing unit 48 performs predetermined processing. Specifically, for example, the image processing unit 48 generates a photographed image 37 in which a character image 38 overlaps and is displayed on a facial portion of the wearer 5A wearing the wearable object 2-1b to which the item 20 of the attribute associated with "photographing rejection setting service" is attached.

Thus, since the wearer 5C browsing the photographed image 37 may not identify the wearer 5A, privacy of the wearer 5A can be protected.

<5. Summarization>

As described above, the control system (control device 1) according to this embodiment can provide the service according to the wearable object 2.

More specifically, the control device 1 according to this embodiment performs the control such that the attribute of the wearable object 2 is detected by analyzing the ID number transmitted from the wearable object 2 or an image of the shape of the wearable object 2 and various services are provided according to the attribute.

For example, the control device 1 provides the service in which the wearer 5 wearing the wearable object 2 is focused on and the photographing is performed. Thus, the wearer 5 can wear the wearable object 2 and enjoy each attraction in a theme park, and can also acquire a photographed image photographed through the automatic focus. The server 4 according to this embodiment can process a photographed image photographed by focusing on the wearer 5 by the control device 1, and then can provide the photographed image.

It should be understood by those skilled in the art that various modifications, combinations, sub-combinations and alterations may occur depending on design requirements and other factors insofar as they are within the scope of the appended claims or the equivalents thereof.

For example, the control device 1 according to this embodiment may modify contents to a service to be provided according to the behavior history associated with the wearable object 2. Specifically, when a GPS logger is installed in the wearable object 2, the wearable object 2 may transmit a behavior history acquired by the GPS logger to the control device 1 and the control device 1 may provide a service according to the behavior history.

The control device 1 according to this embodiment may modify contents of a service to be provided according to the number of visits to a specific area associated with the wearable object 2. Specifically, the identification number of the wearable object 2 may be managed by the server 4. When the wearer 5 enters a specific area such as a predetermined theme park, the control device 1 may determine how many times the wearer 5 has visited based on the identification number of the wearable object 2 and may provide a service according to the number of visits.

For example, the control device 1 according to this embodiment may modify contents of a service to be provided according to the number of steps associated with the wearable object 2. Specifically, when a pedometer is installed in the wearable object 2, the wearable object 2 may transmit the number of steps acquired by the pedometer to the control device 1 and the control device 1 may provide a service according to the number of steps.

The contents of the services associated with the attribute of the wearable object 2 according to this embodiment are not limited to the examples illustrated in FIG. 3. For example, a service in which a predetermined gate in a theme park is opened automatically according to the attribute of the wearable object 2 may be provided. Further, a service in which entrance is guided preferentially for a predetermined attraction in a theme park according to the attribute of the wearable object 2 may be provided.

The wearable object 2 may be used in an area other than the specific area in the theme park or the like. Specifically, when the control device 1 is disposed in the surroundings of an area such as a restaurant, a shop, or a hotel rather than a theme park, the control device 1 may provide a service associated with the attribute of the wearable object 2.

The control device 1 according to this embodiment may not perform the continuous through imaging in consideration of a problem of battery consumption. However, the control device 1 may start through photographing when a trigger signal transmitted from the wearable object 2 is received.

The control system according to this embodiment may include the control device 1 and the server 4. In this case, the control device 1 can acquire the latest attribute information or notification information from the server 4.

When the control system according to this embodiment includes the control device 1 and the server 4, the server 4 may detect the attribute of the wearable object 2 or control the provision of a service. Specifically, for example, the control device 1 sequentially transmits through images to the server 4 and the server 4 sequentially analyzes the through images so that the attribute of the wearable object 2 can be detected.

According to an embodiment of the present disclosure, there is provided (1) A control system comprising:
control circuitry that responds to an optical detection of a wearable object worn by a user by initiating a service provided to the user, the service being associated with the wearable object.

(2) The control system of (1), further comprising:
a network interface that receives an optical detection result from a remotely located optical detector.

(3) The control system of (1), further comprising:
an imaging device that captures an image of the wearable object worn by the user; and an optical detector that detects the wearable object worn by the user from the image captured by the imaging device.

(4) The control system of (1), wherein
the control circuitry is configured to initiate the service based on an attribute of the wearable object.

(5) The control system of (4), wherein
the attribute is at least one of a type of wearable object, a color of the wearable object, an accessory on the wearable object, an illuminated flashing of at least a portion of the wearable object, a movement pattern of the user, and a tag on the wearable object.

(6) The control system of (1), wherein:
the service is one of a photographing service, a notification service, a guide service, a group photographing service, and a photographing rejection setting service.

(7) The control system of (1), wherein
the service is an information providing service that distributes information to a communication device carried by the user.

(8) The control system of (7), wherein:
the information providing service provides at least one of information about an image of the user, a location information, and a guide information.

(9) The control system of (1), wherein
the control circuitry changes the service to a different service in response to a determined state of movement of the user.

(10) The control system of (1), wherein
the control circuitry changes the service to a different service in response to a recorded behavior history of the user.

(11) The control system of (1), wherein
the service is a photographing service and the control circuitry controls an imaging unit to adjust a composition of an image provided by the imagine based on the wearable object.

(12) The control system of (1), wherein
the service is a photographing service and the control circuitry adjusts a processing of an image of the user and the wearable object based on the wearable object.

(13) The control system of (1), further comprising:
a wireless transmitter that transmits data to the wearable object, the wearable object being a glasses-type display device that has at least one display panel disposed in at least one of a left-eye lens position and a right-eye lens position.

(14) A control method comprising:
receiving an indication of a wearable object worn by a user;
associating with control circuitry the wearable object with a service; and
initiating with the control circuitry the service associated with the wearable object.

(15) The control method (14), wherein
the initiating includes initiating the service based on an attribute of the wearable object.

(16) The control method of (15), wherein
the attribute is at least one of a type of wearable object, a color of the wearable object, an accessory on the wearable object, an illuminated flashing of at least a portion of the wearable object, a movement pattern of the user, and a tag on the wearable object.

(17) The control method of (1), wherein
the service is one of a photographing service, a notification service, a guide service, a group photographing service, and a photographing rejection setting service.

(18) The control method of (14), wherein
the service is an information providing service that distributes information to a communication device carried by the user.

(19) The control method of (18), further comprising:
providing via the information providing service at least one of information about an image of the user, a location information, and a guide information.

(20) A non-transitory computer readable storage medium having instructions stored therein that when executed by control circuitry causes the control circuitry to perform a control method, the control method comprising:
receiving an indication of a wearable object worn by a user;
associating with control circuitry the wearable object with a service; and
initiating with the control circuitry the service associated with the wearable object.

(21) A control system including:
a detection unit that detects an attribute of a wearable object; and
a control unit that controls to provide a service to a wearer wearing the wearable object according to the attribute detected by the detection unit.

(22) The control system according to (21), wherein the detection unit detects the attribute of the wearable object based on a captured image obtained by imaging the wearable object or data received from the wearable object.

(23) The control system according to (21) or (22), wherein the detection unit detects, as the attribute of the wearable object, a kind of the wearable object, a color of the wearable object, a blinking pattern of the wearable object, an accessory attached to the wearable object, a two-dimensional tag attached to the wearable object, or a motion of the wearable object by analyzing a captured image obtained by imaging the wearable object.

(24) The control system according to any one of (21) to (23), further including:
an imaging unit,
wherein, when the attribute detected by the detection unit is associated with a photographing service, the control unit controls the imaging unit in a manner that the imaging unit photographs the wearer.

(25) The control system according to (24), wherein the control unit assigns a mark indicating the attribute detected by the detection unit to a captured image captured by the imaging unit.

(26) The control system according to any one of (21) to (23), further including:
an imaging unit,
wherein, when the imaging unit performs imaging continuously and the attribute detected by the detection unit is an attribute configured to give a request for a photographing service, the control unit assigns a mark to captured images captured by the imaging unit.

(27) The control system according to (26), wherein the mark is a mark indicating the attribute detected by the detection unit.

(28) The control system according to any one of (24) to (27), wherein, when the attribute detected by the detection unit is associated with a group photographing service, the control unit performs control in a manner that a plurality of wearers wearing identical wearable objects are contained in an angle of view and imaged.

(29) The control system according to any one of (21) to (23), further including:
a notification unit that gives a notification to the wearer, wherein, when the attribute detected by the detection unit is a request for a predetermined information notification service, the control unit performs control in a manner that the notification unit notifies the wearer of a notification content according to the attribute.

(30) The control system according to any one of (21) to (29), wherein the control unit performs control in a manner that a content of the service to be provided is changed according to a behavior history associated with the wearable object.

(31) The control system according to any one of (21) to (30), wherein the control unit performs control in a manner that a content of the service to be provided is changed according to a number of visits to a specific area associated with the wearable object.

(32) The control system according to any one of (21) to (31), wherein the control unit performs control in a manner that a content of the service to be provided is changed according to a number of steps associated with the wearable object.

(33) The control system according to any one of (21) to (32), wherein the wearable object has a shape imitating a predetermined character.

(34) The control system according to (33), wherein, when the attribute of the wearable object detected by the detection unit is associated with a character photographing service, the control unit performs control in a manner that the wearer and a character imitated by the wearable object worn by the wearer are contained in an angle of view and imaged.

(35) The control system according to any one of (21) to (34), wherein the wearable object is a hat, glasses, clothes, a brooch, a pendant, or an umbrella.

(36) A program for causing a computer to function as:
a detection unit that detects an attribute of a wearable object; and
a control unit that controls to provide a service to a wearer wearing the wearable object according to the attribute detected by the detection unit.

REFERENCE SIGNS LIST 1, 1A, 1B Control device
2, 2A to 2C, 2-1a, 2-1b, 2-2a, 2-2b Wearable object
3 Network
4 Server
5, 5A to 5C Wearer
10, 40 Control unit
11 Detection unit
13 Camera module
14, 44 Attribute information DB
15 Photographed image DB
140 Attribute information
17, 42 Communication unit
18 GPS positioning unit
20, 24A, 24B, 25 Item
21 Light-emitting unit
22 Two-dimensional tag
30, 32, 34, 36, 37 Photographed image
46 Notification information DB
48 Image processing unit

The invention claimed is:
1. An information processing apparatus, comprising:
circuitry configured to:
analyze a through image of a user;
determine an attribute of a wearable device of the user based on the analyzed through image,
wherein the attribute is at least one of a color of the wearable device, an illuminated flashing of at least a portion of the wearable device, or a movement pattern of the user; and
provide a service for the user based on the determined attribute of the wearable device of the user, and a database that stores correspondence between the attribute of the wearable device and the service.

2. The information processing apparatus of claim 1, wherein the attribute further includes at least one of a type of the wearable device, an accessory on the wearable device, or a tag on the wearable device.

3. An information processing method, comprising:
analyzing, by circuitry of an information processing apparatus, a through image of a user;
determining, by the circuitry, an attribute of a wearable device of the user based on the analyzed through image, wherein the attribute is at least one of a color of the wearable device, an illuminated flashing of at least a portion of the wearable device, or a movement pattern of the user; and
providing, by the circuitry, a service for the user based on the determined attribute of the wearable device of the user, and a database that stores correspondence between the attribute of the wearable device and the service.

4. A non-transitory computer-readable medium having stored thereon computer-executable instructions which, when executed by circuitry, cause the circuitry to execute operations, the operations comprising:
analyzing a through image of a user;
determining an attribute of a wearable device of the user based on the analyzed through image, wherein the attribute is at least one of a color of the wearable device, an illuminated flashing of at least a portion of the wearable device, or a movement pattern of the user; and
providing a service for the user based on the determined attribute of the wearable device of the user, and a database that stores correspondence between the attribute of the wearable device and the service.

5. The information processing apparatus of claim 1, wherein the service is one of a photographing service, a notification service, a guide service, a group photographing service, or a photographing rejection setting service.

6. The information processing apparatus of claim 1, wherein the service is an information providing service that distributes information to a communication device of the user.

7. The information processing apparatus of claim 6, wherein the information providing service provides at least one of information about an image of the user, a location information, or a guide information.

8. The information processing apparatus of claim 1, wherein the circuitry is further configured to change the service to a different service based on a determined state of movement of the user.

9. The information processing apparatus of claim 1, wherein the circuitry is further configured to change the service to a different service based on a recorded behavior history of the user.

10. The information processing apparatus of claim 1, wherein the service is a photographing service and the circuitry is further configured to adjust a composition of an image, captured by an imaging unit, based on the wearable device.

11. The information processing apparatus of claim 1, wherein the service is a photographing service and the circuitry is further configured to adjust an image of the user and the wearable device based on the wearable device.

12. The information processing apparatus of claim 1, wherein the circuitry is further configured to transmit data to the wearable device, wherein the wearable device is a glasses-type display device which comprises at least one display panel in at least one of a left-eye lens position or a right-eye lens position.

13. The information processing method of claim 3, wherein the attribute further includes at least one of a type of the wearable device, an accessory on the wearable device, or a tag on the wearable device.

14. The information processing method of claim 3, wherein the service is one of a photographing service, a notification service, a guide service, a group photographing service, or a photographing rejection setting service.

15. The information processing method of claim 3, wherein the service is an information providing service that distributes information to a communication device of the user.

16. The information processing method of claim 15, wherein the information providing service provides at least one of information about an image of the user, a location information, or a guide information.

17. The information processing method of claim 3, further comprising changing, by the circuitry, the service to a different service based on a determined state of movement of the user.

18. The information processing method of claim 3, further comprising changing, by the circuitry, the service to a different service based on a recorded behavior history of the user.

19. The information processing method of claim 3, wherein the service is a photographing service and further comprising adjusting a composition of an image, captured by an imaging unit, based on the wearable device.

20. The information processing method of claim 3, wherein the service is a photographing service and further comprising adjusting, by the circuitry, an image of the user and the wearable device based on the wearable device.

21. The information processing method of claim 3, further comprising:
transmitting, by the circuitry, data to the wearable device, wherein the wearable device is a glasses-type display device which comprises at least one display panel in at least one of a left-eye lens position or a right-eye lens position.

22. The non-transitory computer-readable medium of claim 4, wherein the attribute further includes at least one of a type of the wearable device, an accessory on the wearable device, or a tag on the wearable device.

23. The non-transitory computer-readable medium of claim 4, wherein the service is one of a photographing service, a notification service, a guide service, a group photographing service, or a photographing rejection setting service.

24. The non-transitory computer-readable medium of claim 4, wherein the service is an information providing service that distributes information to a communication device of the user.

25. The non-transitory computer-readable medium of claim 24, wherein the information providing service provides at least one of information about an image of the user, a location information, or a guide information.

26. The non-transitory computer-readable medium of claim 4, further comprising changing the service to a different service based on a determined state of movement of the user.

27. The non-transitory computer-readable medium of claim 4, further comprising changing the service to a different service based on a recorded behavior history of the user.

28. The non-transitory computer-readable medium of claim 4, wherein the service is a photographing service and further comprising adjusting a composition of an image, provided by an imaging unit, based on the wearable device.

29. The non-transitory computer-readable medium of claim 4, wherein the service is a photographing service and further comprising adjusting an image of the user and the wearable device based on the wearable device.

30. The non-transitory computer-readable medium of claim 4, further comprising transmitting data to the wearable device, wherein the wearable device is a glasses-type display device which comprises at least one display panel in at least one of a left-eye lens position or a right-eye lens position.

* * * * *